(12) United States Patent
Sun et al.

(10) Patent No.: US 10,406,924 B2
(45) Date of Patent: Sep. 10, 2019

(54) PORTABLE POWER ELECTRONIC SWITCHING DEVICE FOR CHARGING ELECTRIC VEHICLES BETWEEN EACH OTHER

(71) Applicant: Bordrin Motor Corporation, Inc., Southfield, MI (US)

(72) Inventors: Xiaobo Sun, Shanghai (CN); Zhiwei Zhang, Shanghai (CN)

(73) Assignee: BORDRIN MOTOR CORPORATION, INC., Southfield, MI (US)

( * ) Notice: Subject to any disclaimer, the term of this patent is extended or adjusted under 35 U.S.C. 154(b) by 0 days.

(21) Appl. No.: 15/695,175

(22) Filed: Sep. 5, 2017

(65) Prior Publication Data

US 2019/0070966 A1 Mar. 7, 2019

(30) Foreign Application Priority Data

Mar. 3, 2017 (CN) .......................... 2017 2 0201507

(51) Int. Cl.
*B60L 53/22* (2019.01)
*B60L 11/18* (2006.01)
(Continued)

(52) U.S. Cl.
CPC ....... *B60L 11/1812* (2013.01); *B60L 11/1811* (2013.01); *B60L 11/1816* (2013.01);
(Continued)

(58) Field of Classification Search
CPC .............. B60L 11/1812; B60L 11/1811; B60L 11/1816; B60L 2210/40; B60L 2210/10;
(Continued)

(56) References Cited

U.S. PATENT DOCUMENTS

| 8,509,976 B2* | 8/2013 | Kempton | ............ B60L 11/1824 320/101 |
| 2007/0133239 A1* | 6/2007 | Tanaka | .................. H02M 3/337 363/65 |

(Continued)

FOREIGN PATENT DOCUMENTS

CN 203416032 U 1/2014

*Primary Examiner* — Nathaniel R Pelton
*Assistant Examiner* — Manuel Hernandez
(74) *Attorney, Agent, or Firm* — Brinks Gilson & Lione

(57) ABSTRACT

A portable power electronic switching apparatus may include an input end high-voltage connector, a DC-DC converter circuit, an input end transfer switch, a first inverter circuit, a direct-current output end high-voltage connector, an alternating-current output end high-voltage connector, and a conversion controller, where the input end high-voltage connector may be connected to an input end of the DC-DC converter circuit, an output end of the DC-DC converter circuit may be separately connected to an input end of the first inverter circuit and the direct-current output end high-voltage connector by using the input end transfer switch. An output end of the first inverter circuit may be connected to the alternating-current output end high-voltage connector. The conversion controller may be connected to the first inverter circuit by using a first switch drive circuit, and the conversion controller may be connected to the DC-DC converter circuit by using a transformation ratio switch controller and a second switch drive circuit separately.

8 Claims, 2 Drawing Sheets

(51) Int. Cl.
  *H02M 3/335* (2006.01)
  *H02J 7/00* (2006.01)
  *B60L 53/20* (2019.01)
  *B60L 53/14* (2019.01)
  *H02M 3/337* (2006.01)
  *H02M 7/5387* (2007.01)
  *H02M 1/00* (2006.01)

(52) U.S. Cl.
  CPC ............. *B60L 53/14* (2019.02); *B60L 53/20* (2019.02); *B60L 53/22* (2019.02); *H02J 7/0054* (2013.01); *H02M 3/337* (2013.01); *H02M 3/33569* (2013.01); *H02M 7/53871* (2013.01); *B60L 2210/10* (2013.01); *B60L 2210/30* (2013.01); *B60L 2210/40* (2013.01); *H02J 2007/0059* (2013.01); *H02M 2001/007* (2013.01)

(58) Field of Classification Search
  CPC ...... B60L 2210/30; B60L 53/14; B60L 53/20; B60L 53/22; H02J 7/0054; H02J 2007/0059; H02M 3/33569

USPC ............... 320/103, 104, 105, 140, DIG. 34
  See application file for complete search history.

(56) References Cited

U.S. PATENT DOCUMENTS

| | | | | |
|---|---|---|---|---|
| 2008/0094859 | A1* | 4/2008 | Takayanagi | H02M 1/10 363/17 |
| 2008/0101096 | A1* | 5/2008 | Takayanagi | B60L 58/20 363/17 |
| 2008/0198632 | A1* | 8/2008 | Takayanagi | H02M 7/797 363/17 |
| 2008/0316774 | A1* | 12/2008 | Ito | B60K 6/48 363/17 |
| 2011/0273917 | A1* | 11/2011 | Maitra | H02J 3/383 363/74 |
| 2013/0020993 | A1* | 1/2013 | Taddeo | H02J 7/0027 320/109 |
| 2015/0175021 | A1* | 6/2015 | Kim | B60L 11/1812 320/109 |
| 2016/0368390 | A1* | 12/2016 | Yang | B60L 1/003 |

\* cited by examiner

PORTABLE POWER ELECTRONIC SWITCHING DEVICE FOR CHARGING ELECTRIC VEHICLES BETWEEN EACH OTHER

PRIORITY CLAIM

This application claims priority to Chinese Patent Application No. 201720201507.2 filed on Mar. 3, 2017, the contents of which are herein incorporated by reference in its entirety.

BACKGROUND

1. Field of the Invention

The present invention generally relates to the field of power electronics, and in particular, to a portable power electronic switching apparatus for charging electric vehicles between each other.

2. Description of Related Art

Electric vehicles are becoming more popular due in part to concerns regarding the environment as well as the cost of petroleum-based fuels. However, the quantity of charging stations for electric vehicles and the costs associated with constructing and maintaining these charging stations for the electric vehicles have limited the development of the electric vehicle industry.

Existing electric vehicles are usually charged in two modes: 1. direct-current charging, which is generally known as fast charging; and 2. alternating-current charging, which is generally known as slow charging. When an electric vehicle needs to be charged, one must find a place, such as a charging station, where charging can be performed. When the battery of an electric vehicle is depleted and there are no charging stations nearby, an unfortunate situation can occur where the vehicle is inoperable.

Chinese Patent No. CN203416032U discloses a multifunctional charging apparatus for an electric vehicle, including a charging station, an energy storage unit, a bidirectional converter, a central control unit, an alternating-current charging interface for an electric vehicle, and a direct-current charging interface for an electric vehicle. The apparatus integrates an alternating-current charging station and a direct-current charging station and can store electric energy in an off-peak period, thereby reducing electrical power costs. Although the apparatus has a small volume and can be conveniently disposed, site selection and construction still need to be performed, and the apparatus cannot be constructed within a short time. Moreover, a problem of charging an electric vehicle cannot be resolved when there is no power supply in a remote area.

SUMMARY

A portable power electronic switching apparatus, which can implement two charging modes, namely, direct-current charging and alternating-current charging, between different electric vehicles, is disclosed. The apparatus has a simple structure, high efficiency, and is portable.

The portable power electronic switching apparatus, used for mutual charging between electric vehicles, may include an input end high-voltage connector, a DC-DC converter circuit, an input end transfer switch, a first inverter circuit, a direct-current output end high-voltage connector, an alternating-current output end high-voltage connector, and a conversion controller. The input end high-voltage connector may be connected to an input end of the DC-DC converter circuit. An output end of the DC-DC converter circuit may be separately connected to an input end of the first inverter circuit and the direct-current output end high-voltage connector by using the input end transfer switch. An output end of the first inverter circuit may be connected to the alternating-current output end high-voltage connector. The conversion controller may be connected to the first inverter circuit by using a first switch drive circuit. The conversion controller may be connected to the DC-DC converter circuit by using a transformation ratio switch controller and a second switch drive circuit separately.

The DC-DC converter circuit may include a second inverter circuit, a voltage regulating transformer, and a rectifier circuit that may be sequentially connected. An input end of the second inverter circuit may be connected to the input end high-voltage connector. An output end of the rectifier circuit may be connected to the input end transfer switch. The conversion controller may be connected to the voltage regulating transformer by using the transformation ratio switch controller. The conversion controller may be connected to the second inverter circuit by using the second switch drive circuit.

A full-bridge inverter circuit including four insulated gate bipolar transistors (IGBTs) may be used as the second inverter circuit. A full-bridge inverter circuit including four IGBTs may be used as the first inverter circuit.

The apparatus further may include a voltage detection sensor and an input end switch. The input end high-voltage connector may be connected to the input end of the DC-DC converter circuit by using the input end switch. The voltage detection sensor may be disposed between the input end high-voltage connector and the input end switch. The conversion controller may be separately connected to the voltage detection sensor and the input end switch.

The apparatus further may include a first filter circuit. The input end high-voltage connector may be connected to the input end of the DC-DC converter circuit by using the first filter circuit.

The apparatus further may include a second filter circuit and a third filter circuit. The input end transfer switch may be connected to the direct-current output end high-voltage connector by using the second filter circuit. The input end transfer switch may be connected to the first inverter circuit by using the third filter circuit.

The conversion controller may be connected to a liquid crystal display screen.

The apparatus further may include a timer and a working status display lamp that may be separately connected to the conversion controller.

The apparatus further may include a high-voltage connection cable. The input end high-voltage connector, the direct-current output end high-voltage connector, and the alternating-current output end high-voltage connector may be separately connected to a charging interface of an electric vehicle by using a high-voltage connection cable.

Compared with the prior art, the apparatus has the following advantages.

First, the apparatus allows for one electric vehicle to charge the battery another electric vehicle. Moreover, a vehicle having more energy charges a vehicle having less energy. By so doing, this negates or minimizes the need for a charging station.

Second, the apparatus can convert, by using a filter circuit and a DC-DC converter circuit, a direct current into a direct current having a higher voltage for output, and an inverter circuit that is added following the DC-DC circuit can convert a direct current to an alternating current, which can implement two charging modes: direct-current charging and alternating-current charging.

Third, a second switch drive circuit and a transformation ratio switch controller are disposed in the apparatus, and a second inverter circuit and a voltage regulating transformer that are in the DC-DC converter circuit are adjusted by using a conversion controller, so as to change an output voltage of the apparatus. Therefore, charging voltage requirements of electric vehicles of different models can be met, making the apparatus more practical and versatile.

Fourth, a voltage detection sensor is disposed at an input end of the apparatus and can determine an output battery voltage of an electric vehicle in real time. The conversion controller controls an input end switch by determining whether a measured value of the voltage detection sensor reaches an output voltage threshold. When the battery voltage does not reach the threshold, the conversion controller switches off the input end switch and terminates a charging activity, so that a charging process is more secure and more reliable.

Fifth, different charging modes are selected for a circuit of the apparatus by using an input end transfer switch. A circuit structure is simpler, and the apparatus has a small volume, so that the apparatus is portable, and is easier to be popularized and used.

Sixth, the apparatus may include a timer, which can calculate a charging time. The apparatus further may include a working status display lamp and a liquid crystal display. The working status display lamp can display a working status of a charging apparatus, and the liquid crystal display can display information, such as a charging time, transmitted power, and a power transmission mode so that people can conveniently learn a charging status and control a charging process.

Seventh, multiple filter circuits are further disposed on the apparatus, so as to ensure voltage stability in the process of exchanging electric energy between electric vehicles.

Further objects, features, and advantages of this invention will become readily apparent to persons skilled in the art after a review of the following description, with reference to the drawings and claims that are appended to and form a part of this specification.

DESCRIPTION

Figure 1:
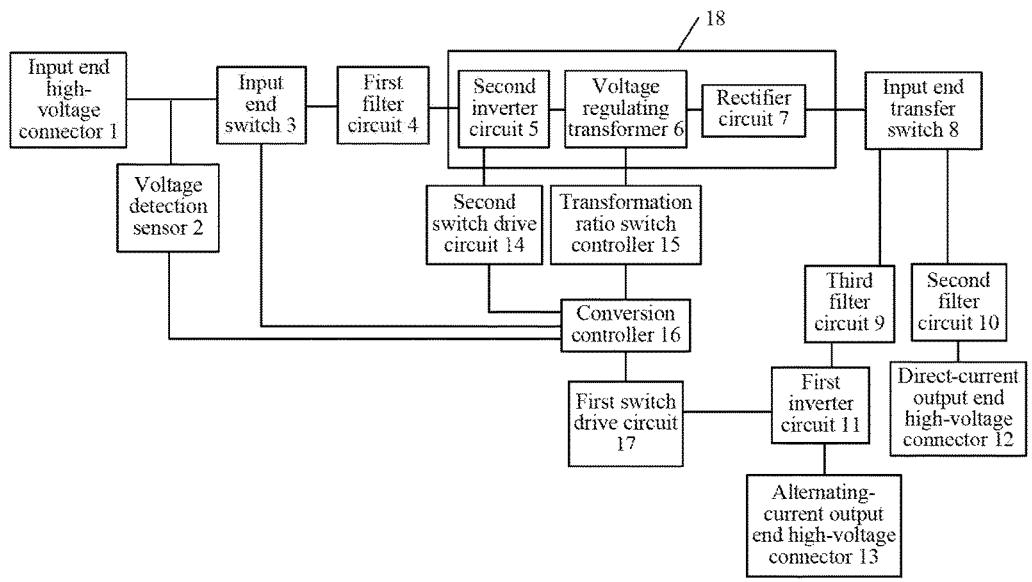
FIG. 1 illustrates a block diagram of a circuit connection of a portable power electronic switching apparatus.

Referring to FIG. 1, a portable power electronic switching apparatus, used for mutual charging between electric vehicles, may include an input end high-voltage connector 1, a DC-DC converter circuit 18, an input end transfer switch 8, a first inverter circuit 11, a direct-current output end high-voltage connector 12, an alternating-current output end high-voltage connector 13, and a conversion controller 16. The input end high-voltage connector 1 may be connected to an input end of the DC-DC converter circuit 18.

An output end of the DC-DC converter circuit 18 may be separately connected to an input end of the first inverter circuit 11 and the direct-current output end high-voltage connector 12 by using the input end transfer switch 8. The input end transfer switch 8 may implement switching between two output ends of the direct-current output end high-voltage connector 12 and the alternating-current output end high-voltage connector 13. Moreover, functions of alternating-current charging and direct-current charging are integrated, and the DC-DC converter circuit 18 for direct-current charging may be used during alternating-current charging. Therefore, the structure is more compact, and production costs can be reduced.

An output end of the first inverter circuit 11 may be connected to the alternating-current output end high-voltage connector 13. The conversion controller 16 may be connected to the first inverter circuit 11 by using a first switch drive circuit 17. The conversion controller 16 may be connected to the DC-DC converter circuit 18 by using a transformation ratio switch controller 15 and a second switch drive circuit 14 separately. Different charging requirements of different electric vehicles can be met by disposing the conversion controller 16, the transformation ratio switch controller 15, and the second switch drive circuit 14.

The DC-DC converter circuit 18 may include a second inverter circuit 5, a voltage regulating transformer 6, and a rectifier circuit 7 that are sequentially connected. An input end of the second inverter circuit 5 may be connected to the input end high-voltage connector 1. An output end of the rectifier circuit 7 may be connected to the input end transfer switch 8. The conversion controller 16 may be connected to the voltage regulating transformer 6 by using the transformation ratio switch controller 15. The conversion controller 16 may be connected to the second inverter circuit 5 by using the second switch drive circuit 14.

The apparatus further may include a voltage detection sensor 2 configured to detect a charging state of an electric vehicle that provides electric energy and an input end switch 3. The input end high-voltage connector 1 may be connected to the input end of the DC-DC converter circuit 18 by using the input end switch 3. The voltage detection sensor 2 may be disposed between the input end high-voltage connector 1 and the input end switch 3. The conversion controller 16 may be separately connected to the voltage detection sensor 2 and the input end switch 3. When remaining power of the electric vehicle that provides electric energy reaches a set value, a charging circuit may be disconnected in time by using the input end switch 3, so as to protect the electric vehicle that provides electric energy.

The apparatus further may include a first filter circuit 4. The input end high-voltage connector 1 may be connected to the input end of the DC-DC converter circuit 18 by using the first filter circuit 4.

The apparatus further may include a second filter circuit 10 and a third filter circuit 9. The input end transfer switch 8 may be connected to the direct-current output end high-voltage connector 12 by using the second filter circuit 10. The input end transfer switch 8 may be connected to the first inverter circuit 11 by using the third filter circuit 9.

Figure 2:
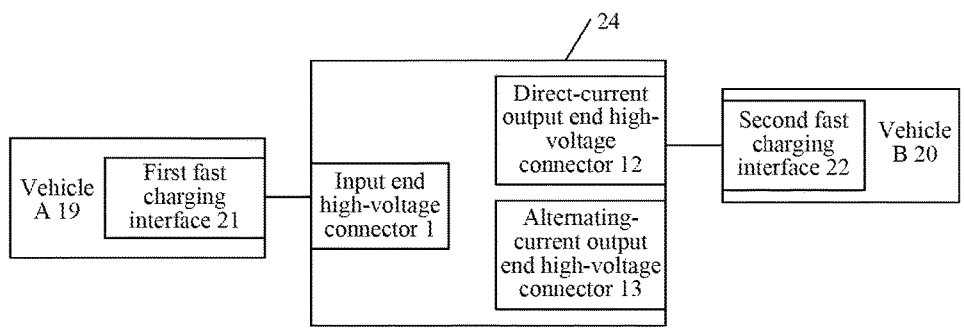
FIG. 2 illustrates a schematic diagram of implementing direct-current charging by a portable power electronic switching apparatus.

As shown in FIG. 2, an internal circuit of the portable power electronic conversion apparatus may be integrated in a housing 24, and therefore, is taken more conveniently. A direct-current charging interface of an existing electric vehicle is used as a fast charging interface and a slow charging interface. During charging, a vehicle A 19 that transmits electric energy, a portable power electronics apparatus, and a vehicle B 20 that receives electric energy are connected by using a high-voltage connection cables 26 and 27. A first fast charging interface 21 of the vehicle A 19 may be connected to the input end high-voltage connector 1 of the apparatus.

Figure 3:
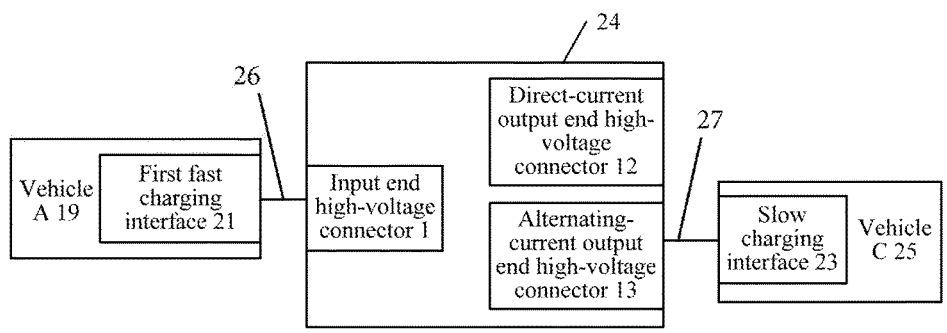
FIG. 3 illustrates a schematic diagram of implementing alternating-current charging by a portable power electronic switching apparatus.

The direct-current output end high-voltage connector 12 of the apparatus may be connected to a second fast charging interface 22 of the vehicle B 20. After a voltage of a battery E1 of the vehicle A 19 is increased, a battery E2 of the vehicle B 20 is charged. Alternatively, as shown in FIG. 3, the alternating-current output end high-voltage connector 13 of the apparatus is connected to a slow charging interface 23 of a vehicle C 25, and after direct-current of the battery of the vehicle A 19 is inverted into an alternating current, the vehicle C 25 is charged by using slow charging interfaces L and N. The two charging modes may be selected by using the conversion controller 16, which is more flexible and convenient.

Figure 4:
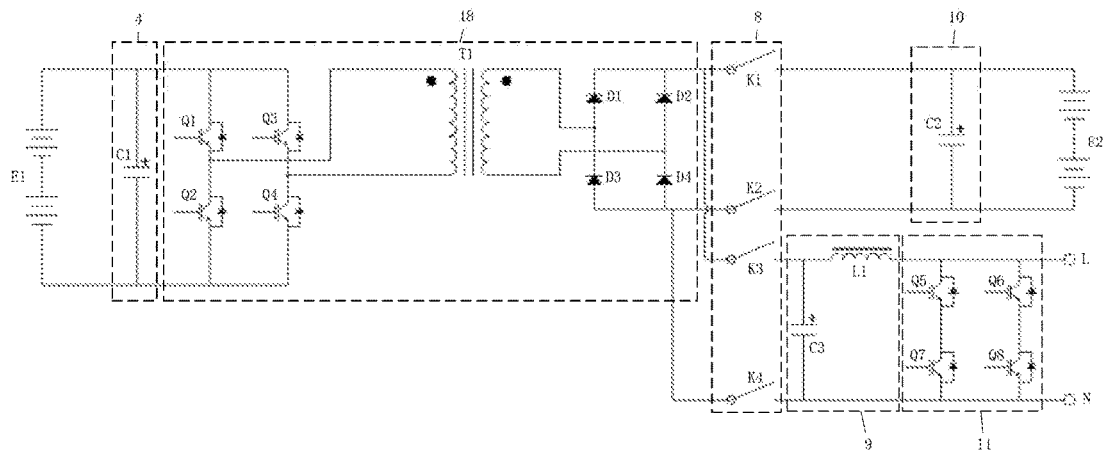
FIG. 4 illustrates a circuit diagram of a connection among a DC-DC converter circuit, an input end transfer switch, and a first inverter circuit that are in a portable power electronic switching apparatus.

As shown in FIG. 4, a full-bridge inverter circuit including four IGBTs may be used as either of the first inverter circuit 11 and the second inverter circuit 5. Switches K1 to K4 in FIG. 3 are the input end transfer switches 8. When charging is performed by using a direct current, K1 and K2 are connected, and K3 and K4 are disconnected. When charging is performed by using an alternating current, K1 and K2 are disconnected, and K3 and K4 are connected.

Figure 5:
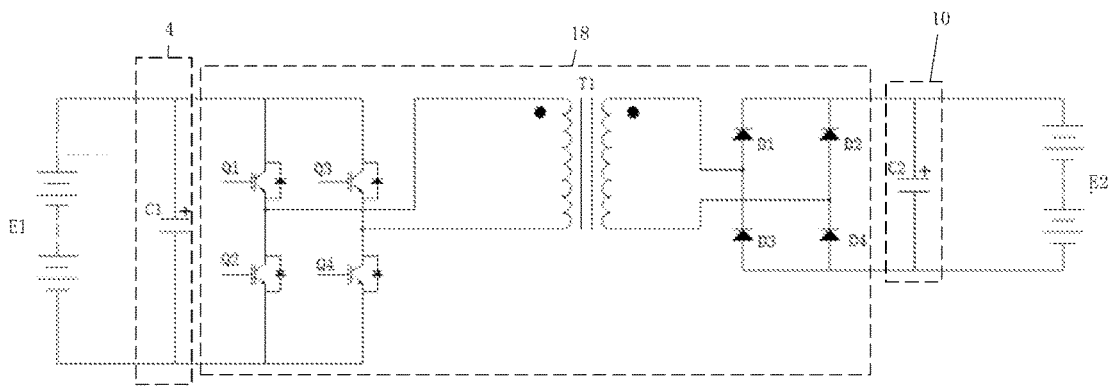
FIG. 5 illustrates a diagram of a portable power electronic switching apparatus during direct-current charging.

FIG. 5 is a schematic circuit diagram of a manner of performing charging by using a direct current. The first filter circuit 4 may include a filter capacitor C1. In the DC-DC converter circuit 18, the second inverter circuit 5 may include IGBT power tubes Q1, Q2, Q3, and Q4. The voltage regulating transformer 6 may include a transformer T1, and a band switch on a coil of the transformer T1. The band switch may be connected to the transformation ratio switch controller 15. The rectifier circuit may include diodes D1, D2, D3, and D4.

The second filter circuit 10 may include a capacitor C2. When charging is performed by using a direct current, after being filtered by the capacitor C1, a direct-current high voltage of the battery of the vehicle A 19 is alternately conducted by the IGBT power tubes Q1 and Q4, and Q2 and Q3, so as to drive a primary coil of the transformer T1. A function of full-bridge rectification may be implemented, by using the diodes D1, D2, D3, and D4, for an alternating current generated by a secondary coil of the transformer T1.

Figure 6:
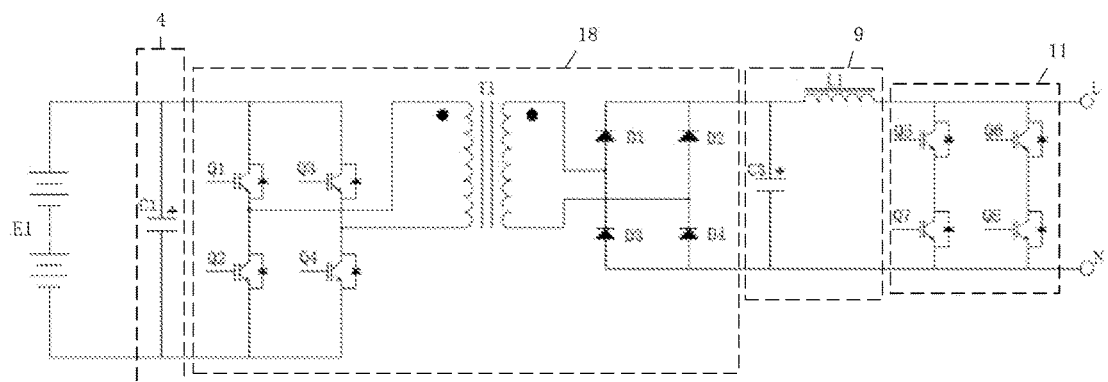
FIG. 6 illustrates a diagram of a portable power electronic switching apparatus during alternating-current charging.

After being filtered by the filter capacitor C2, the battery of the vehicle B 20 may be charged by using a direct current. The conversion controller 16 changes a ratio of the quantity of turns of primary coils to the quantity of turns of secondary coils of the transformer T1 by using the transformation ratio switch controller 15. Meanwhile, the conversion controller 16 adjusts duty ratios of the IGBT power tubes Q1, Q2, Q3, and Q4 by using the second switch drive circuit 14, so as to adjust an output voltage, and charge the vehicle B 20 by using a proper voltage. The apparatus may have different charging modes to allow for charging different types of electric vehicles FIG. 6 is a schematic circuit diagram of a manner of performing charging by using an alternating current. The third filter circuit 9 may include a filter capacitor C3 and a filter inductor L1. The first inverter circuit 11 may include IGBT power tubes Q5, Q6, Q7, and Q8. When charging is performed by using an alternating current, after being filtered by the capacitor C1, a direct-current high voltage of the battery of the vehicle A 19 may be alternately conducted by the IGBT power tubes Q1 and Q4, and Q2 and Q3 to obtain an alternating current.

Voltage adjustment is performed for the alternating current, and a full-bridge rectification function may be implemented by using the diodes D1, D2, D3, and D4. Filtering may be performed by the filter inductor L1 and the filter capacitor C3, to obtain a direct current. In this case, IGBT power tubes Q5 and Q8, and Q6 and Q7 perform conduction alternately to implement an inversion function, to obtain a 220 V alternating-current voltage. The alternating-current voltage is output to the slow charging interface 23 of the vehicle B 20. Therefore, a function of slow charging from the vehicle A 19 to the vehicle B 20 may be implemented. In addition to charging, the alternating current may be further used by a household electrical device.

The apparatus further may include a timer and a working status display lamp that are separately connected to the conversion controller 16. The timer and the working status display lamp can time a charging process, and display a charging status in time.

The conversion controller 16 of the apparatus may include a single-chip microcomputer circuit, and may be connected to a liquid crystal display screen. The liquid crystal display may display information, such as a working status of the apparatus and transmitted energy, so that people can conveniently control a charging process. In an alternative embodiment, dedicated hardware implementations, such as application specific integrated circuits, programmable logic arrays and other hardware devices, can be constructed to implement one or more of the methods described herein.

Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" may include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A portable power electronic switching apparatus configured to charge a battery of a second electric vehicle using energy from a battery of a first electric vehicle, wherein the battery of the first electric vehicle powers the first electric vehicle and the battery of the second electric vehicle powers the second electric vehicle, the apparatus comprising:
    an input end connector, wherein the input end of the connector is configured to be connected to the first electric vehicle having the battery,
    a DC-DC converter circuit,
    an input end transfer switch,
    a first inverter circuit having full-bridge inverter circuit comprising four insulated-gate bipolar transistors (IGBTs) forming a full bridge circuit,
    a direct-current output end connector, wherein the direct-current output end connector is configured to be connected to the second electric vehicle, allowing for the transfer of energy from the battery of the first electric vehicle to the battery of the second electric vehicle,
    an alternating-current output end connector,
    a conversion controller, the conversion controller is connected to the first inverter circuit by using a first switch drive circuit;
    wherein the input end connector is connected to an input end of the DC-DC converter circuit,
    an output end of the DC-DC converter circuit is separately connected to an input end of the first inverter circuit and the direct-current output end connector by using the input end transfer switch,
    an output end of the first inverter circuit is connected to the alternating-current output end connector,
    a transformation ratio switch controller connected to both the DC-DC converter circuit and the conversion controller,
    a second switch drive circuit connected to both the DC-DC converter circuit and the conversion controller,
    wherein the DC-DC converter circuit comprises:
        a second inverter circuit, a voltage regulating transformer, and a rectifier circuit that are sequentially connected,
        wherein the rectifier circuit is a diode bridge rectifier,
        an input end of the second inverter circuit is connected to the input end connector,
        an output end of the rectifier circuit is connected to the input end transfer switch,
        the conversion controller is connected to the voltage regulating transformer by using the transformation ratio switch controller, and
        the conversion controller is connected to the second inverter circuit by using the second switch drive circuit, and
    a first filter circuit, the first filter circuit connects the rectifier circuit to the first inverter circuit.

2. The portable power electronic switching apparatus according to claim 1, wherein a full-bridge inverter circuit comprising four insulated gate bipolar transistors (IGBTs) is used as the second inverter circuit.

3. The portable power electronic switching apparatus according to claim 1, further comprising:
    a voltage detection sensor and an input end switch,
    the input end connector is connected to the input end of the DC-DC converter circuit by using the input end switch,
    the voltage detection sensor is disposed between the input end connector and the input end switch, and
    the conversion controller is separately connected to the voltage detection sensor and the input end switch.

4. The portable power electronic switching apparatus according to claim 1, further comprising a second filter circuit, and the input end connector is connected to the input end of the DC-DC converter circuit by using the second filter circuit.

5. The portable power electronic switching apparatus according to claim 1, further comprising:
    a third filter circuit,
    the input end transfer switch is connected to the direct-current output end connector by using the third filter circuit.

6. The portable power electronic switching apparatus according to claim 1, wherein the conversion controller is connected to a liquid crystal display screen.

7. The portable power electronic switching apparatus according to claim 1, further comprising a timer and a working status display lamp that are separately connected to the conversion controller.

8. The portable power electronic switching apparatus according to claim 1, further comprising:
    a connection cable, and the input end connector,
    the direct-current output end connector, and
    the alternating-current output end connector are separately connected to a charging interface of the first or second electric vehicle by using the connection cable.

* * * * *